United States Patent [19]

Green

[11] 4,063,383

[45] Dec. 20, 1977

[54] PRODUCTION OF MUSHROOM SPAWN

[75] Inventor: Joseph Green, Maidenhead, England

[73] Assignee: H. J. Heinz Company Limited, Hayes, England

[21] Appl. No.: 677,648

[22] Filed: Apr. 16, 1976

[30] Foreign Application Priority Data

Apr. 18, 1975 United Kingdom ............... 16140/75

[51] Int. Cl.² ............................................. A01G 1/04
[52] U.S. Cl. ....................................... 47/1.1; 206/439
[58] Field of Search ................ 55/384, 522; 206/439; 47/1.1

[56] References Cited

U.S. PATENT DOCUMENTS

| 2,520,318 | 8/1950 | Lescarboura | 47/1.1 |
| 2,677,917 | 5/1954 | Speakman | 47/1.1 |
| 2,851,821 | 9/1958 | Guiochon | 47/1.1 |
| 3,335,521 | 8/1967 | Sohm | 47/1.1 |
| 3,938,658 | 2/1976 | Rohde | 206/439 |

FOREIGN PATENT DOCUMENTS

| 2,207,634 | 6/1974 | France | 47/1.1 |
| 2,012,423 | 10/1971 | Germany | 47/1.1 |
| 25,682 | 7/1971 | Japan | 47/1.1 |
| 1,176,188 | 1/1970 | United Kingdom | 47/1.1 |

Primary Examiner—Robert E. Bagwill
Attorney, Agent, or Firm—Sughrue, Rothwell, Mion, Zinn and Macpeak

[57] ABSTRACT

A sterilizable bag for use in the production of mushroom spawn has at least a panel of microporous plastics sheet material, for example microporous polypropylene or polyethylene, which is a good bacterial filter. In use the bag is filled with a particulate nutrient material, sterilized, inoculated with mycelium, and then stored under incubation conditions for growth of the mycelium through the nutrient material.

20 Claims, 2 Drawing Figures

PRODUCTION OF MUSHROOM SPAWN

BACKGROUND OF THE INVENTION

1. Field of the Invention

This invention relates to the production of mushroom spawn and particularly to sterilizable bags, for use in the production of mushroom spawn. More especially the invention provides a sterilizable bag for mycelium growing medium. The growing medium, usually inoculated with mycelium, is fed into the bag, which is then sealed and stored under incubating conditions for growth of the mycelium to produce a bag of mushroom spawn which can be shipped directly for use by the mushroom grower and is a convenient package for sale. Inoculation may be carried out with the growing medium already in the bag.

The invention also relates to an improved method for producing mushroom spawn in such sterilizable bags.

2. Description of the Prior Art

In one process currently in use mushroom spawn is produced in bags, by filling a bag with particulate nutrient material for example grains of rye, sterilizing the bag and the nutrient material, and then inoculating with mycelium before sealing the bag under sterile conditions, and finally leaving the contents of the bag to incubate. In order to grow mycelium through the medium in the bag, oxygen is necessary and carbon dioxide is given off. It is also necessary to maintain sterile conditions during growth, so that the mushroom spawn is not comtaminated. In the present practice mushroom spawn is produced by growing mycelium in rye in sealed plastic bags. One wall of each bag includes a paper panel which acts as a bacterial filter but through which both oxygen and carbon dioxide can pass.

Such bags are intended as the final package for delivery of the mushroom spawn product to the customer, but have the disadvantage that water present during growth wets the paper strip which loses strength and becomes a poor bacterial filter.

It is sometimes necessary to shake the bag during incubation. This is thought to draw infection into the nutrient medium through the paper strip whose bacterial filtering qualities are deteriorating. Also this process is labour intensive and requires strong bags to withstand the shaking.

It is a main object of the present invention to provide an improved sterilizable bag, particularly for mycelium growing medium, which does not suffer the disadvantage of the known bags and which permits the mycelium to grow right through the medium in the bag without the need for shaking the bag during the growth period.

SUMMARY

The invention provides a sterilizable bag, comprising at least a panel of microporous plastics sheet material which is a good bacterial filter and permits passage of oxygen and carbon dioxide.

One wall of the bag may be of transparent plastics sheet material with the other wall of the bag comprising at least a panel of microporous plastics sheet material, the walls being sealed together to form the bag. Transpiration is through said other wall, which may be completely microporous and, would usually be placed uppermost when the bags are stacked on shelves for incubation, so that there is ample air circulation over that wall.

In another embodiment of the invention said other wall is of transparent plastics sheet material which is perforated and is lined with a panel of said microporous plastics sheet material.

In one form of this other embodiment the bag may comprise a sheet of transparent plastics sheet material having a central perforated zone which is lined with said panel of microporous plastics sheet material, which sheet is folded over with opposite edges seamed together and said zone located in one wall of the bag.

Preferably the transparent plastics sheet material is polyethylene, polypropylene or nylon. Growth can therefore be inspected visually. The choice of material is governed by cost considerations and the method of sterilization. Polyethylene can be sterilized chemically or by irradiation. Polypropylene and nylon may be heat sterilized. The microporous plastics sheet material is usually opaque or translucent.

A preferred microporous plastics sheet material is microporous polyethylene or polypropylene having pores of size less than 0.5 $\mu$m. Alternatively the microporous wall may be a sheet of mechanically perforated plastics material having pores as small as can be made mechanically. The pores may be of size greater than 1 $\mu$m if incubation takes place in a controlled atmosphere which is substantially free from bacteria.

The invention also includes a bag according to the invention which is closed and sterile and contains sterilized particulate nutrient medium inoculated with mycelium. Such a bag would then be stored under incubation conditions to permit the mycelium to grow through the nutrient material.

Further the invention provides a bag of the invention which is closed and sterile and contains particulate nutrient medium with mycelium growth through the medium. By using a bag according to the invention the mycelium growth can go to its full extent right through the nutrient medium and after incubation the bag full of mushroom spawn is ready for shipping to the grower.

The particulate nutrient medium may be sterile hydrated grain, for example rye or millet, or horse manure with added nutrient.

The invention further provides a method of producing mushroom spawn comprising placing in a bag according to the invention a particular nutrient material for growing mycelium, sterilizing the bag, inoculating the nutrient medium with mycelium, and storing the bag under mycelium incubation conditions, with said microporous panel exposed, for a time permitting the mycelium to grow through the nutrient material with intake of oxygen and expulsion of carbon dioxide through the panel.

In this method the particulate nutrient material is preferably sterile hydrated grain, for example rye or millet, or horse manure with added nutrient.

BRIEF DESCRIPTION OF THE DRAWINGS

Some embodiments of the invention will now be described, by way of example, with reference to the accompanying drawings in which:-

DESCRIPTION OF THE PREFERRED EMBODIMENTS

Figure 1:
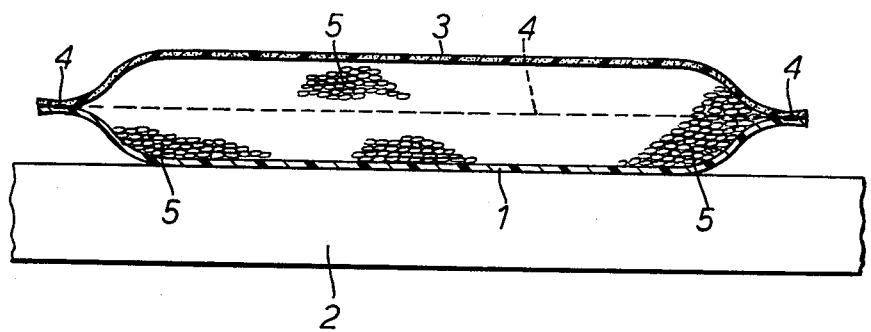
FIG. 1 is a cross-section through a sterile bag according to the invention which is full of growing medium and is lying on a shelf during incubation.

The bag illustrated in FIG. 1 has a lowermost wall 1 of transparent plastics material, for example polyethylene, polypropylene or nylon sheet of 500 gauge. The container is shown lying on a shelf 2 during incubation. The other wall 3 which is the upper wall in the drawing is of an opaque microporous plastics material which is a good bacterial filter and which permits passage of oxygen and carbon dioxide through that wall, as well as respiration of water to avoid condensation within the bag, without any appreciable drying-out of the nutrient medium.

The two walls are sealed together as indicated at 4 either by heat sealing or by using a suitable adhesive. In practice the bag is first sealed around three sides and then sterilized in suitable manner before being filled with the sterilized particulate nutrient medium 5, for example rye. The rye is prepared in known manner by first hydrating the rye in an autoclave for a time to give the grains a 50% moisture content. Finely divided chalk/gypsum mixture or other suitable material such as Fuller's Earth, are then thoroughly mixed with the hydrated grains to keep them separate. The autoclave is then closed and the grain sterilized and cooled prior to being batched into the bags under sterile conditions. A batch of grain 5, which loosely fills the bag, is inoculated with mycelium, for example with an inoculation rate of up to 10%, and then the fourth side of the bag is sealed under sterile conditions. The bag is then ready to be placed on a shelf under incubation conditions in which there is flow of air over the upper wall of the bag.

When the microporous wall is mechanically perforated the air is maintained as near uncontaminated as possible, and a high level of inoculation is employed to promote maximum growth of mycelium thereby inhibiting growth of unwanted bacteria.

The microporous wall 3 of the bag is in one embodiment a sheet of microporous polypropylene of 500 gauge and having pores of size less than 0.5 $\mu$m. When using such material for the wall 3 the impervious wall 1 may be of polyethylene and prior to filling the bag is sterilized by radiation.

The chosen porosity of the microporous polypropylene sheet 3 is such that the wall 3 of the bag acts as a bacterial filter so that bacteria cannot enter the rye 5 through the wall 3, while during growth of the mycelium oxygen can be drawn into the bag through the wall 3 and carbon dioxide resulting from the growth is expelled.

In this embodiment the whole of the wall of the bag which is in contact with air is microporous, and there is equal growth of mycelium right through the grain 5. This growth can be inspected from day to day through the wall 1 which is sufficiently transparent to ensure that the growth is visible. No shaking or turning of the bag is necessary during incubation and after an incubation period of for example 8 days the bag is ready to be transported to the grower or other customer.

It has been found that growth is effective in many sizes of bags containing from 0.5 lbs up to 15 lbs of grain with effective incubation up to 100% in from 7 to 9 days under usual incubation conditions.

When the bag is to be used in conditions in which the air is as near uncontaminated as possible, the wall 3 of the bag may be made of polyethylene film of 500 gauge which is mechancally perforated with minute perforations as small as can be made, the pore size being greater than 1 micrometer. This permits transpiration through the wall 3 of oxygen inwards and carbon dioxide outwards. The impervious wall 1 is of polyethylene and the bag is sterilized by radiation prior to filling. A high level of inoculation is employed to promote maximum growth of mycelium thereby inhibiting growth of unwanted bacteria on the grains.

Other grain may be used as the particulate growing material, for example millet seed. Horse manure with added nutrient may be used.

Figure 2:
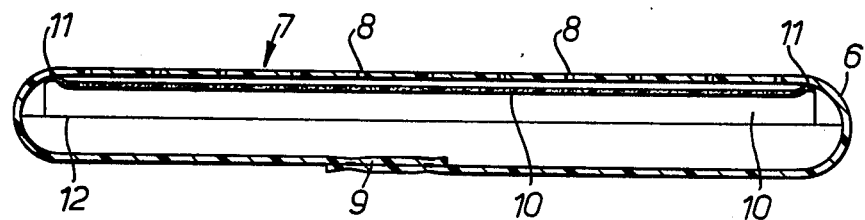
FIG. 2 is a transverse cross-section through another bag according to the invention, which bag is shown empty.

Another design of sterilizable bag according to the invention is illustrated in FIG. 2. The bag comprises a sheet of transparent plastics sheet material, for example polyethylene, polypropylene or nylon sheet of 500 gauge. The sheet has a central perforated zone 7 in the form of a central strip extending along the length of the sheet and having perforations 8.

The perforations 8 are preferably of the order of 1 mm in diameter produced by using an arrangement of hot needles. The perforations may be larger punched holes for example 5 mm or 6 mm in diameter.

The sheet is folded over with the longer edges of the sheet overlaid and seamed together with a double seam, 9. The seamed wall of the bag is the impervious wall which, in use, is the lowermost wall which lies on a shelf during incubation. The perforated zone 7 is located in the other wall of the bag which during incubation is the uppermost wall.

The perforated zone 7 is lined with a panel 10 of microporous plastics sheet material, for example a panel of microporous polypropylene or polyethylene having pores of size less than 0.5 $\mu$m. The side edges 11 of the panel 10 are sealed to the inner face of the sheet 6, at either side of the central perforated zone 7. One end of the bag is sealed by a seam 12, prior to sterilization and filling with the sterile nutrient medium, and one end of the panel 10 is sealed into the seam 12. The other end of the panel 10 is sealed into the seam which closes the bag when it has been filled.

When the filled bag is placed on a shelf under incubation conditions the flow of air through the perforations 8 supplies the oxygen flow through the bacterial filter consitituted by the lining panel 10. Carbon dioxide given off during mycelium growth flows through the lining panel 10 and then out through the perforations 8.

The bacterial filtration function is thus maintained, and the two walls of the bag are of comparable strength, since they are formed from the same sheet of transparent plastics material.

A modification of bag of FIG. 2 may be employed, the bag consisting of two walls of transparent plastics sheet material, one of which is perforated and is lined with a panel of the microporous plastics sheet material. The two walls and the panel are of comparable size and are seamed together around their edges.

I claim:

1. A sterilizable bag, comprising a sheet of transparent plastics sheet material having a central perforated zone which is lined with a panel of microporous plastics sheet material which is a good bacterial filter and permits passage of oxygen and carbon dioxide, said sheet being folded over with opposite edges seamed together and said zone located in one wall of the bag.

2. A bag according to claim 1, wherein the transparent plastics sheet material is one material selected from the group consisting of polyethylene, polypropylene, and nylon.

3. A bag according to claim 1, wherein the mircoporous plastics sheet material is one material selected from the group consisting of microporous polypropylene and microporous polyethylene having pores of a size less than 0.5 μm.

4. A bag according to claim 1, wherein the microporous plastics sheet material is perforated polyethylene having pores of size greater than 1 μm.

5. A sterilizable bag for carrying a particulate nutrient material for growing mycelium subsequent to inoculation of the nutrient material with mycelium and upon storing of the bag under mycelium incubation conditions, said sterilizable bag including opposed walls formed of transparent plastics sheet material, at least a zone of which is perforated and said perforated zone being lined internally with a panel of microporous sheet material which is a good bacterial filter and permits passage of oxygen and carbon dioxide.

6. A bag according to claim 5, wherein the transparent plastics sheet material is one material selected from the group consisting of polyethylene, polypropylene and nylon.

7. A bag according to claim 5, wherein the microporous plastics sheet material is one material selected from the group consisting of microporous polypropylene and microporous polyethylene, both having pores of a size less than 0.5 μm.

8. A bag according to claim 5, wherein the microporous plastics sheet material is perforated polyethylene having pores of size greater than 1 μm.

9. A bag according to claim 5, the bag being closed and sterile and containing sterilized particulate nutrient medium inoculated with mycelium.

10. A bag according to claim 9, wherein the particulate nutrient medium is sterile hydrated grain.

11. A bag according to claim 10, wherein the grain is rye or millet.

12. A bag according to claim 9, wherein the nutrient medium is horse manure with added nutrient.

13. A bag according to claim 5, the bag being closed and sterile and containing particulate nutrient medium with mycelium growth through the medium.

14. A sterilizable bag for carrying a particulate nutrient material for growing mycelium subsequent to inoculation of the nutrient material with mycelium and storage of the bag under mycelium incubation conditions, said sterilizable bag comprising one wall of transparent plastic sheet material and another opposing wall of perforated transparent plastic sheet material, said perforated wall being lined internally with a panel of microporous plastic sheet material which is a good bacterial filter and permits passage of oxygen and carbon dioxide.

15. A bag according to claim 14, wherein the microporous plastic sheet material is one material selected from the group consisting of polyethylene and polypropylene.

16. A bag according to claim 14, wherein the microporous plastic sheet material is one material selected from the group consisting of microporous polyethylene and microporous polypropylene, both having pores of size less than 0.5 mm.

17. A method of producing mushroom spawn comprising:
placing in a sterilizable bag having opposed sealed walls formed of transparent plastic material at least a zone of which is perforated and said zone is lined internally with a panel of microporous plastics sheet material which is a good bacterial filter and permits passage of oxygen and carbon dioxide,
a particulate nutrient material for growing mycelium,
sterilizing the bag,
inoculating the nutrient material with mycelium, and
storing the bag under mycelium incubation conditions, with said microporous panel exposed, for a time permitting the mycelium to grow through the nutrient material with intake of oxygen and expulsion of carbon dioxide through the panel.

18. A method according to claim 17, wherein the particulate nutrient material is sterile hydrated grain.

19. A method according to claim 18, wherein the grain is rye or millet.

20. A method according to claim 17, wherein the nutrient medium is horse manure with added nutrient.

* * * * *

UNITED STATES PATENT AND TRADEMARK OFFICE
CERTIFICATE OF CORRECTION

PATENT NO. : 4,063,383
DATED : December 20, 1977
INVENTOR(S) : Joseph Green

It is certified that error appears in the above-identified patent and that said Letters Patent are hereby corrected as shown below:

Claim 16, line 5 of that claim, change [ 0.5 mm] to

----- 0.5 cm -----

Signed and Sealed this

Eleventh Day of April 1978

[SEAL]

Attest:

RUTH C. MASON
*Attesting Officer*

LUTRELLE F. PARKER
*Acting Commissioner of Patents and Trademarks*